(12) United States Patent
Jung

(10) Patent No.: US 9,778,356 B2
(45) Date of Patent: Oct. 3, 2017

(54) AUTONOMOUS EMERGENCY BRAKING SYSTEM AND METHOD FOR RECOGNIZING PEDESTRIAN THEREIN

(71) Applicant: MANDO CORPORATION, Pyeongtaek-si, Gyeonggi-do (KR)

(72) Inventor: Soo Myung Jung, Seoul (KR)

(73) Assignee: MANDO CORPORATION, Pyeongtaek-si (KR)

( * ) Notice: Subject to any disclaimer, the term of this patent is extended or adjusted under 35 U.S.C. 154(b) by 325 days.

(21) Appl. No.: 14/723,923

(22) Filed: May 28, 2015

(65) Prior Publication Data

US 2015/0346337 A1 Dec. 3, 2015

(30) Foreign Application Priority Data

May 30, 2014 (KR) .......................... 10-2014-0065774

(51) Int. Cl.
  *G01S 13/93* (2006.01)
  *G01S 13/86* (2006.01)
(52) U.S. Cl.
  CPC .......... *G01S 13/931* (2013.01); *G01S 13/867* (2013.01); *G01S 2013/9346* (2013.01)
(58) Field of Classification Search
  CPC ................. G01S 13/867; G01S 13/931; G01S 2013/9346
  USPC ........................................................ 342/55
  See application file for complete search history.

(56) References Cited

U.S. PATENT DOCUMENTS

2014/0152488 A1* 6/2014 Baba ..................... G01S 13/867
  342/70

FOREIGN PATENT DOCUMENTS

| JP | 2013-145205 A | 7/2013 |
| KR | 100206239 B1 | 9/1998 |
| KR | 1020120012180 A | 2/2012 |

OTHER PUBLICATIONS

Chinese Office Action dated Jun. 15, 2017 from SIPO in connection with the counterpart Chinese Patent Application No. 201510289364.0.

* cited by examiner

*Primary Examiner* — Timothy A Brainard
(74) *Attorney, Agent, or Firm* — Hauptman Ham, LLP

(57) ABSTRACT

An autonomous emergency braking system for performing emergency braking when a potential collision object is recognized during traveling of a vehicle, comprises a camera, a radar sensor and an electronic control unit. The camera is installed in the vehicle to acquire an image signal of a proximity of the vehicle. The radar sensor is configured to detect an object located in a preset detection region from the vehicle. The electronic control unit is configured to, when a counterpart vehicle is located adjacent to a pedestrian, generate a pedestrian detection signal that is not included in a detection signal acquired by the radar sensor, and recognize the pedestrian by fusing the generated pedestrian detection signal and a pedestrian detection signal detected by the camera.

8 Claims, 4 Drawing Sheets

AUTONOMOUS EMERGENCY BRAKING SYSTEM AND METHOD FOR RECOGNIZING PEDESTRIAN THEREIN

CROSS-REFERENCE(S) TO RELATED APPLICATION

This application claims priority of Korean Patent Application No. 10-2014-0065774, filed on May 30, 2014, in the Korean Intellectual Property Office, which is hereby incorporated by reference in its entirety.

BACKGROUND OF THE INVENTION

Field of the Invention

The present invention relates to an autonomous emergency braking system and a method for recognizing a pedestrian therein, and more particularly, to an autonomous emergency braking system and a method for recognizing a pedestrian therein, which generate a pedestrian detection signal that is not included in a detection signal of a radar sensor and recognize a pedestrian by performing fusion with respect to the pedestrian, when the pedestrian is located adjacent to a counterpart vehicle.

Description of the Related Art

In the past, a braking system operates to recognize a pedestrian ahead by using a camera and a radar sensor, determine a risk of collision with the pedestrian by measuring a distance and a relative speed with respect to the pedestrian, and avoid the collision when it is determined that there is the risk of the collision.

Many applications and publications (for example, Korean Patent Registration No. 206239 issued on Apr. 7, 1999) disclose technologies for warning of collision between a vehicle and a pedestrian.

In addition, many applications (for example, Korean Patent Publication No. 10-2012-0012180 published on Feb. 9, 2012) disclose autonomous emergency braking systems. The autonomous emergency braking system refers to a system that recognizes a vehicle ahead and an obstacle (for example, a pedestrian) during the traveling of a vehicle and performs emergency braking when it is determined that there is a risk of collision, thus preventing a collision accident.

An existing autonomous emergency braking system recognizes a vehicle and a pedestrian through fusion of a camera and radar sensors. When a pedestrian stands beside the vehicle, a radar signal of the vehicle is stronger than a radar signal of the pedestrian, and therefore, the radar signal of the pedestrian is absorbed into the radar signal of the vehicle. In this case, the existing autonomous emergency braking system performs fusion on only the radar signal of the vehicle, without fusion on the radar signal of the pedestrian. Thus, the pedestrian may not be recognized.

Therefore, there is a need for an autonomous emergency braking system capable of resolving non-fusion of a pedestrian even when the pedestrian is located adjacent to a vehicle.

CITATION LIST

Patent Literature (Patent literature 1) Korean Patent Registration No. 206239 (Apr. 7, 1999) entitled "VEHICLE-PEDESTRIAN COLLISION WARNING APPARATUS"

(Patent literature 2) Korean Patent Application Publication No. 10-2012-0012180 (Feb. 8, 2012) entitled "METHOD FOR INHIBITING ENGINE STOP IN OPERATION OF AUTONOMOUS EMERGENCY BRAKING SYSTEM"

SUMMARY OF THE INVENTION

An aspect of the present invention is directed to an autonomous emergency braking system and a method for recognizing a pedestrian therein, which generate a pedestrian detection signal that is not included in a detection signal of a radar sensor and recognize a pedestrian by performing fusion on the pedestrian when the pedestrian is located adjacent to a counterpart vehicle.

According to an embodiment of the present invention, there is provided an autonomous emergency braking system for performing emergency braking when a potential collision object is recognized during traveling of a vehicle, the autonomous emergency braking system including: a camera installed in the vehicle to acquire an image signal of a proximity of the vehicle; a radar sensor configured to detect an object located in a preset detection region from the vehicle; and an electronic control unit configured to, when a counterpart vehicle is located adjacent to a pedestrian, generate a pedestrian detection signal that is not included in a detection signal acquired by the radar sensor, and recognize the pedestrian by fusing the generated pedestrian detection signal and a pedestrian detection signal detected by the camera.

The electronic control unit may calculate a distance between the counterpart vehicle and the pedestrian based on the image signal and, when the calculated distance is within a preset reference distance and a strength of the detection signal detected by the radar sensor is higher than a preset reference strength, generate the pedestrian detection signal, and recognize the pedestrian by fusing the generated pedestrian detection signal and the pedestrian detection signal detected by camera.

When the strength of the detection signal is not higher than the preset reference strength, the electronic control unit may compare a speed of the counterpart vehicle, which is located in the proximity of the vehicle, with a preset reference speed based on the detection signal, and when the speed of the counterpart vehicle is higher than the preset reference speed, the electronic control unit may generate the pedestrian detection signal.

When the calculated distance is out of the preset reference distance or when the speed of the counterpart vehicle is not higher than the preset reference speed, the electronic control unit may determine that the pedestrian is unrecognized.

According to an embodiment of the present invention, there is provided a method for recognizing a pedestrian in an autonomous emergency braking system for performing emergency braking when a potential collision object is recognized during traveling of a vehicle, the autonomous emergency braking system including a camera installed in the vehicle to acquire an image signal of a proximity of the vehicle and a radar sensor configured to detect an object located in a preset detection region from the vehicle, the method including: receiving the image signal acquired by the camera; receiving a detection signal acquired by the radar sensor; and when a counterpart vehicle is located adjacent to a pedestrian, generating a pedestrian detection signal that is not included in the detection signal acquired from the radar sensor, and recognizing the pedestrian by fusing the generated pedestrian detection signal and a pedestrian detection signal detected by the camera.

The recognizing of the pedestrian may include: calculating a distance between the counterpart vehicle and the pedestrian based on the image signal; determining whether the calculated distance is within a preset reference distance; when it is determined that the calculated distance is within the preset reference distance and a strength of the received detection signal is higher than a preset reference strength, generating the pedestrian detection signal; and recognizing the pedestrian by fusing the generated pedestrian detection signal and the detected pedestrian detection signal.

The generating of the pedestrian detection signal may include: when it is determined that the strength of the detection signal is not higher than the preset reference strength, comparing a speed of the counterpart vehicle, which is located in the proximity of the vehicle, with a preset reference speed based on the detection signal; and when the speed of the counterpart vehicle is higher than the preset reference speed, generating the pedestrian detection signal.

The method may further include, before the generating of the pedestrian detection signal, determining that the pedestrian is unrecognized, when the calculated distance is out of the preset reference distance or when the speed of the counterpart vehicle is not higher than the preset reference speed.

DETAILED DESCRIPTION OF EXEMPLARY EMBODIMENTS

Exemplary embodiments of the present invention will be described below in detail with reference to the accompanying drawings.

Figure 1:
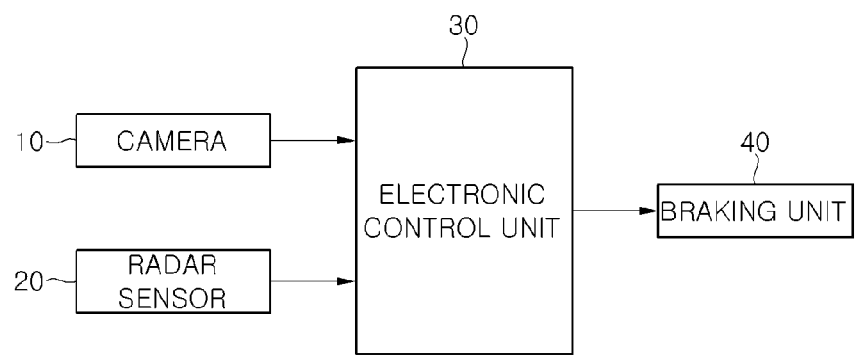
FIG. 1 is a block diagram for describing an autonomous emergency braking system according to an embodiment of the present invention.
Figure 2:
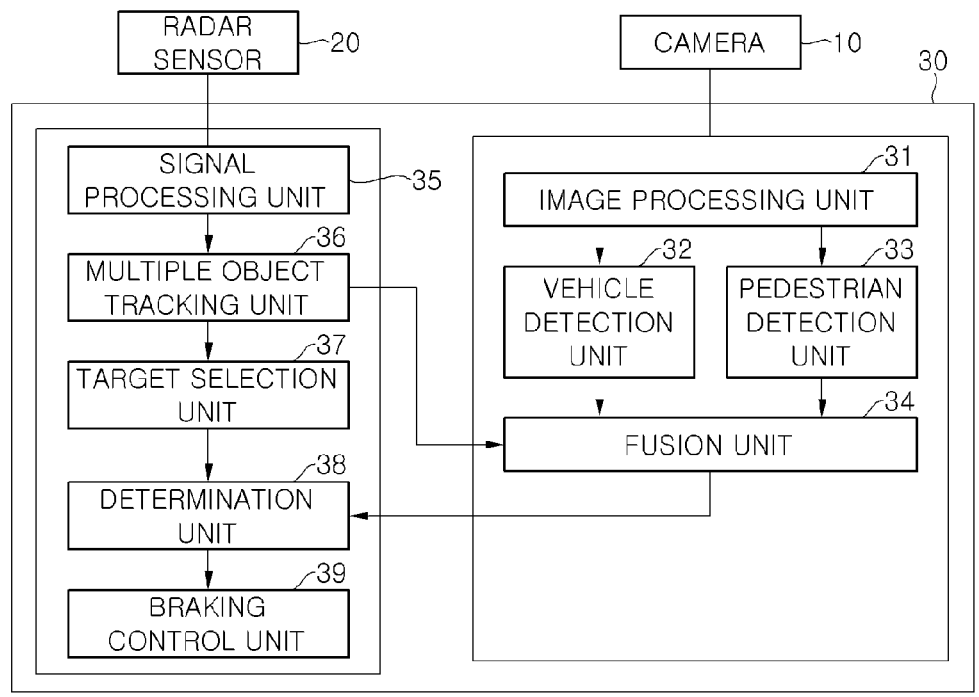
FIG. 2 is a block diagram for describing a method for recognizing a pedestrian by fusing signals acquired from a camera and a radar sensor in an autonomous emergency braking system according to an embodiment of the present invention.

FIG. 1 is a block diagram for describing an autonomous emergency braking system according to an embodiment of the present invention. FIG. 2 is a block diagram for describing a method for recognizing a pedestrian by fusing signals acquired from a camera and a radar sensor in the autonomous emergency braking system according to an embodiment of the present invention.

Referring to FIG. 1, the autonomous emergency braking system according to the embodiment of the present invention includes a camera 10 installed in a host vehicle to acquire an image of the proximity of the host vehicle, a radar sensor 20 installed in the host vehicle to detect an object located at a preset detection distance, for example, a long distance, and an electronic control unit 30 configured to fuse signals received from the camera 10 and the radar sensor 20 and recognize either or both of a counterpart vehicle and a pedestrian.

The camera 10 may be a near infrared (NIR) camera. The image of the proximity of the host vehicle, which is acquired by the camera 10, is transferred to the electronic control unit 30. As illustrated in FIG. 2, the electronic control unit 30 includes an image processing unit 31 configured to process an image signal received through the camera 10, a vehicle detection unit 32 and a pedestrian detection unit 33 configured to detect a vehicle and a pedestrian according to the image signal processed by the image processing unit 31, and a fusion unit 34 configured to receive and fuse a counterpart vehicle detection signal and a pedestrian detection signal based on signals received through the vehicle detection unit 32 and the pedestrian detection unit 33 and a detection signal detected by the radar sensor 20.

The radar sensor 20 may detect the counterpart vehicle, the pedestrian, or the like, which is located at a long distance from the host vehicle, and determine whether an object is located in the proximity of the host vehicle. When it is determined that the object is located in the proximity of the host vehicle, the radar sensor 20 may detect a distance between the object and the host vehicle, a relative speed, or the like. The detection signal, which is acquired by the radar sensor 20, is transferred to the electronic control unit 30.

Referring to FIG. 2, the electronic control unit 30 includes a signal processing unit 35 configured to process a plurality of detection signals detected by the radar sensor 20, a multiple object tracking unit 36 configured to track distances of the detection signals processed by the signal processing unit 35, a target selection unit 37 configured to select a target (for example, a counterpart vehicle, a pedestrian, an obstacle, or the like) located at the closest distance among multiple objects detected by the multiple object tracking unit 36, a determination unit 38 configured to determine a final target by using the target selected by the target selection unit 37 and a target fused by the fusion unit 34, and a braking control unit 39 configured to output, to a braking unit 40, an emergency braking signal for preventing collision with the final target determined by the determination unit 38.

Specifically, in a case where the pedestrian is detected based on the image signal acquired by the camera 10 but the pedestrian detection signal is not included in the detection signal detected by the radar sensor 20, the electronic control unit 30 determines a position of the counterpart vehicle and a position of the pedestrian based on the image signal acquired by the camera 10, and calculates a distance between the counterpart vehicle and the pedestrian. When the calculated distance is within a preset reference distance and a strength of the detection signal detected by the radar sensor 20 is higher than a preset reference strength, the electronic control unit 30 generates a pedestrian detection signal and recognizes the pedestrian by fusing the generated pedestrian detection signal and a pedestrian signal detected based on the image signal acquired from the camera 10. The reference strength is determined when the strength of the detection signal detected by the radar sensor 20 is higher than the strength of the detection signal that detects only the pedestrian. Since the vehicle detection signal is stronger than the pedestrian detection signal by 5 dB or more, the reference strength may be determined to be lower than the strength of the vehicle detection signal by 5 dB.

In addition, in a case where the strength of the detection signal is not higher than the reference strength, the electronic control unit 30 determines whether a speed of the counterpart vehicle is equal to or higher than a preset reference speed. When it is determined that the speed of the counterpart vehicle is equal to or higher than the reference speed, the electronic control unit 30 may generate the pedestrian detection signal and recognize the pedestrian by fusing the generated pedestrian detection signal and the pedestrian detection signal detected based on the image signal acquired from the camera 10. In this case, since the pedestrian cannot move faster than the vehicle, the reference speed is determined to be higher than the maximum speed of the pedestrian by experience.

As described above, when the pedestrian is located beside the host vehicle, the detection signal detected by the radar sensor 20 is stronger for the vehicle than for the pedestrian. Therefore, the detection signal that detects the counterpart vehicle is dominant. Hence, only the detection signal that detects the counterpart vehicle can be measured. In addition, the speed of the counterpart vehicle in the proximity of the host vehicle is generally higher than the speed of the pedestrian. By using the fact that it is possible to recognize the counterpart vehicle when a relative speed is higher than the reference speed, the pedestrian located adjacent to the counterpart vehicle can be recognized in such a way of generating the pedestrian detection signal when the strength of the detection signal is higher than the reference strength and generating the pedestrian detection signal when the speed of the counterpart vehicle is not higher than the reference speed, in a case where the detection signal of the pedestrian adjacent to the counterpart vehicle is lost.

A method for recognizing a pedestrian in the autonomous emergency braking system configured as above will be described with reference to FIG. 3.

Figure 3:
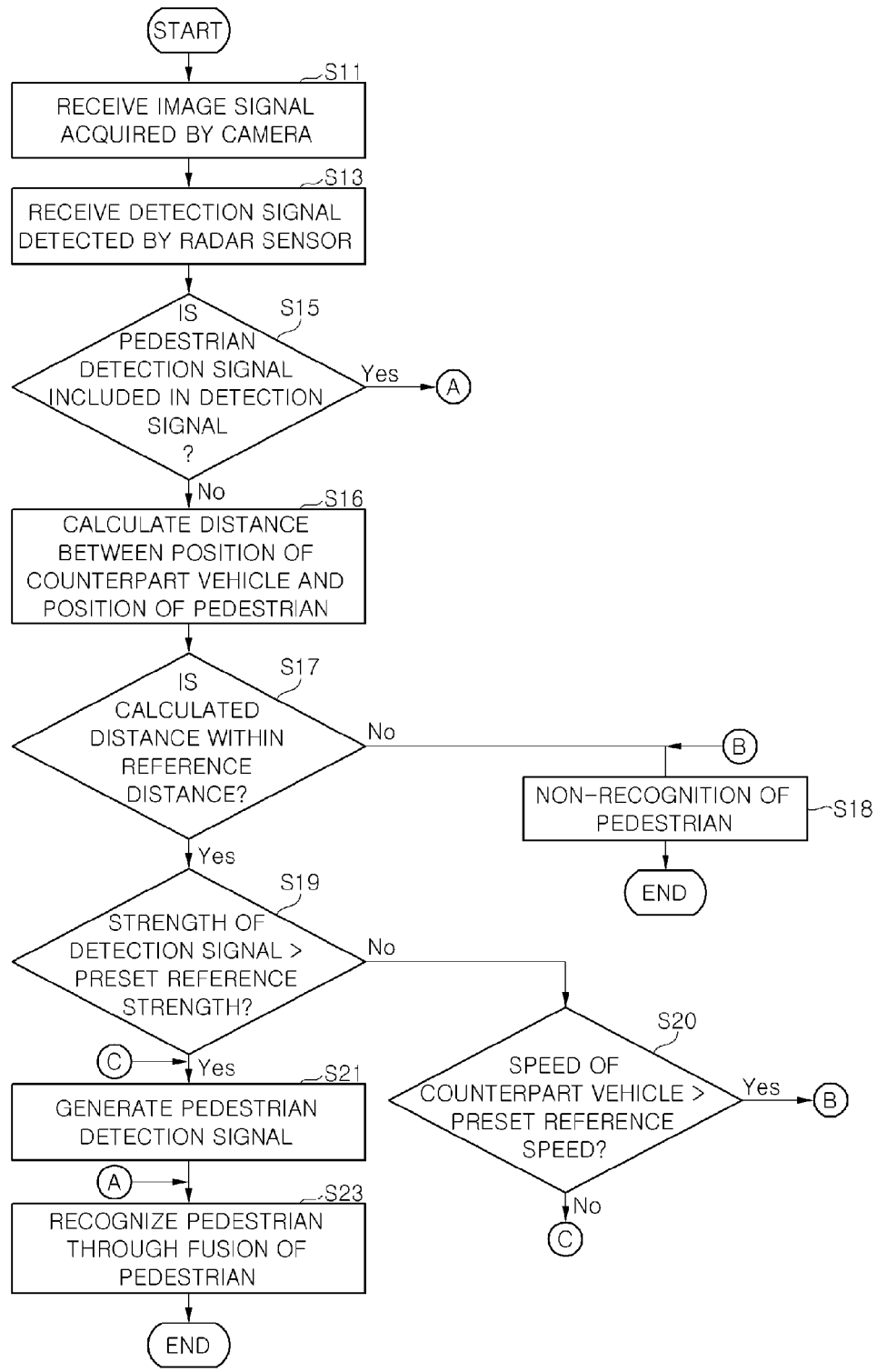
FIG. 3 is a flowchart of a method for recognizing a pedestrian in an autonomous emergency braking system according to an embodiment of the present invention.

FIG. 3 is a flowchart of a method for recognizing a pedestrian in the autonomous emergency braking system according to an embodiment of the present invention.

Referring to FIG. 3, in step S11, the electronic control unit 30 receives an image signal acquired by the camera 10.

In step S13, the electronic control unit 30 receives a detection signal detected by the radar sensor 20.

Steps S11 and S13 are not limited to the above-described sequence, and steps S11 and S13 may be performed in any sequence as long as steps S11 and S13 are performed before the following step S15.

In step S15, when a pedestrian is detected based on the received image signal, the electronic control unit 30 determines whether a pedestrian detection signal is included in the received detection signal.

In step S23, when it is determined in step S15 that the pedestrian detection signal is included in the received detection signal, the electronic control unit 30 recognizes the pedestrian by fusing a pedestrian signal detected based on the received image signal and the pedestrian detection signal included in the detection signal.

In step S16, when it is determined in step S15 that the pedestrian detection signal is not included in the received detection signal, the electronic control unit 30 calculates a distance between the pedestrian and a counterpart vehicle based on the image signal acquired by the camera 10.

In step S17, the electronic control unit 30 determines whether the calculated distance is within a preset reference distance. In step S18, when it is determined in step S17 that the calculated distance is not within the preset reference distance, that is, when the calculated distance is out of the preset reference distance, the electronic control unit 30 determines that the pedestrian is unrecognized.

In step S19, when it is determined in step S17 that the calculated distance is within the preset reference distance, the electronic control unit 30 determines whether a strength of the detection signal detected by the radar sensor 20 is larger than a preset reference strength.

In step S21, when it is determined in step S19 that the strength of the detection signal is higher than the preset reference strength, the electronic control unit 30 generates a pedestrian detection signal. That is, the electronic control unit 30 generates the pedestrian detection signal, which had been lost because the pedestrian is located beside the counterpart vehicle although the above-described conditions are satisfied.

In step S23, the electronic control unit 30 recognizes the pedestrian by fusing the generated pedestrian detection signal and the pedestrian signal detected based on the image signal acquired by the camera 10.

In step S20, when it is determined in step S19 that the strength of the detection signal is not higher than the preset reference strength, the electronic control unit 30 determines whether the speed of the counterpart vehicle, which is measured based on the detection signal received in step S13, is higher than the preset reference speed.

When it is determined in step S20 that the speed of the counterpart vehicle is higher than the preset reference speed, the electronic control unit 30 proceeds to step S18 and determines that the pedestrian is unrecognized.

When it is determined in step S20 that the speed of the counterpart vehicle is not higher than the preset reference speed, the electronic control unit 30 proceeds to step S21 and generates the pedestrian detection signal.

Thereafter, the electronic control unit 30 may control the braking unit 40 when it is determined that emergency braking is required, based on the distance between the recognized pedestrian and the host vehicle.

In this manner, even when the pedestrian is not fused because the pedestrian is located beside the counterpart vehicle, it is possible to generate the pedestrian detection signal and fuse the pedestrian in a case where the distance between the counterpart vehicle and the pedestrian is within the reference distance and the strength of the detection signal detected by the radar sensor 20 is higher than the reference strength.

Figure 4:
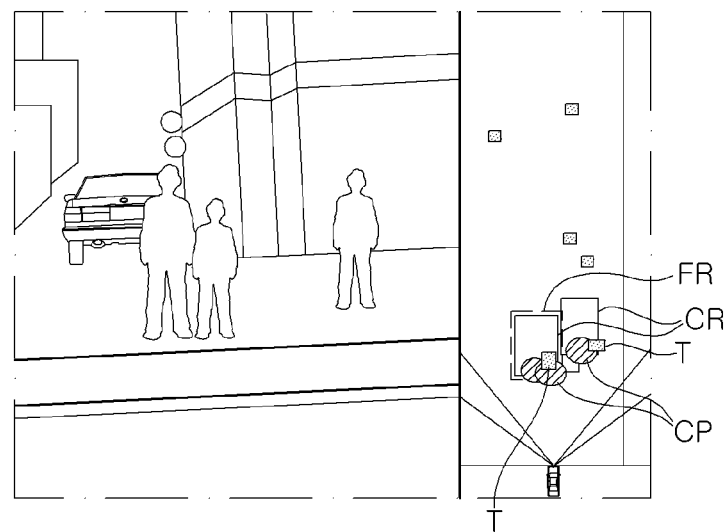
FIG. 4 is a diagram for describing an environment in which a pedestrian is fused when the pedestrian is ahead of a vehicle.
Figure 5:
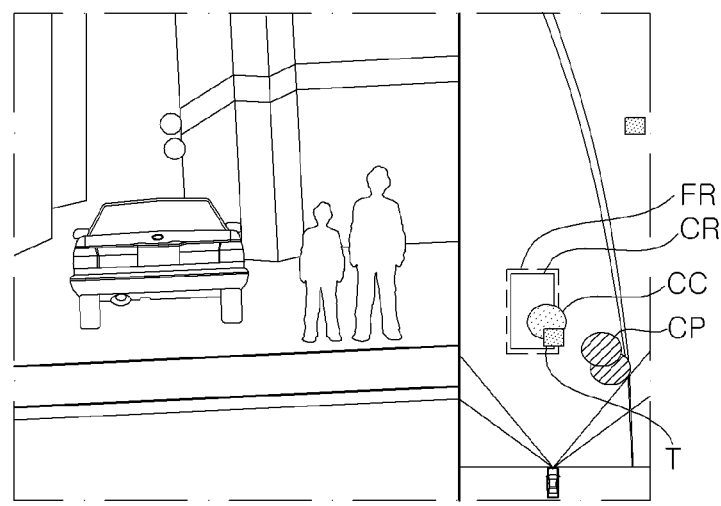
FIG. 5 is a diagram for describing an environment in which only a vehicle is fused and a pedestrian is not fused when the pedestrian is located beside a counterpart vehicle.

As illustrated in FIG. 4, the pedestrian is recognized by fusing the pedestrian detection signal measured by the radar sensor 20 and the pedestrian recognized by the camera 10 in a driving situation in which the pedestrian is located ahead of the host vehicle. By the way, as illustrated in FIG. 5, in a case where the pedestrian stands beside the counterpart vehicle, the radar signal of the counterpart vehicle is stronger than the radar signal of the pedestrian, and therefore, the radar signal of the pedestrian is absorbed into the radar signal of the counterpart vehicle. As a result, it is hard to recognize the pedestrian because only the counterpart vehicle is fused and the pedestrian is not fused.

Figure 6:
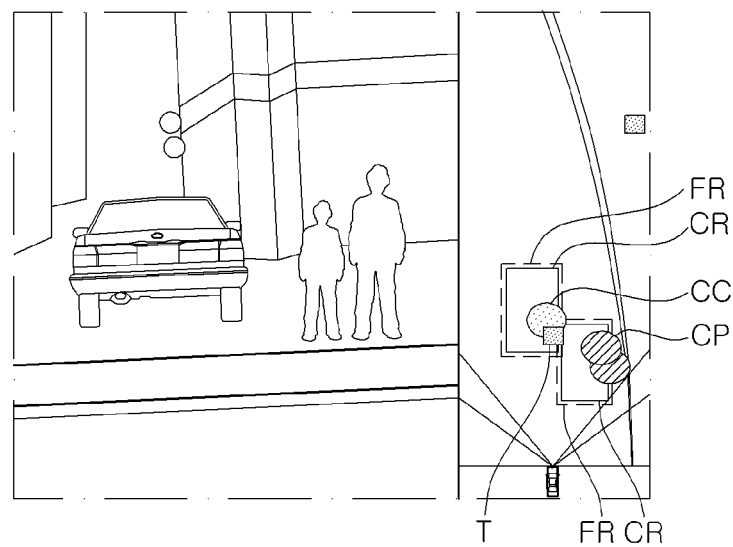
FIG. 6 is a diagram for describing an environment in which both a vehicle and a pedestrian are fused when the pedestrian is located beside a counterpart vehicle by applying an autonomous emergency braking system according to an embodiment of the present invention.

Referring to FIGS. 4 to 6, a rectangle T, which is filled with dots, indicates a target measured and recognized by the radar sensor 20. A circle CC, which is filled with dots, indicates a vehicle recognized by the camera 10. A circle CP, which is filled with diagonal lines, indicates a pedestrian recognized by the camera 10. In addition, a dotted rectangular frame FR with a blank interior indicates a fusion region. A solid rectangular frame CR with a blank interior indicates control target candidates.

FIG. 4 illustrates an environment in which a distance between a counterpart vehicle ahead and a pedestrian ahead is equal to or greater than a reference distance. It can be seen from FIG. 4 that there is illustrated the fusion region FR in which the pedestrian detection signal detected by the camera 10 and the pedestrian detection signal included in the detection signal of the radar sensor 20 are fused. FIG. 5 illustrates an environment in which a distance between the counterpart vehicle ahead of the host vehicle and the pedestrian is within the reference distance. It can be seen from FIG. 5 that there is illustrated the fusion region FR in which fusion is performed on only the counterpart vehicle because the radar signal of the counterpart vehicle is stronger than the radar signal of the pedestrian, and thus, the radar signal of the pedestrian is absorbed into the radar signal of the counterpart vehicle.

The autonomous emergency braking system according to the embodiment of the present invention has been made in an effort to solve the problem that cannot recognize the pedestrian because the pedestrian is not fused as illustrated in FIG. 5. Specifically, as illustrated in FIG. 6, the autonomous emergency braking system according to the embodiment of the present invention recognizes the pedestrian through the camera. Then, when the pedestrian detection signal is not included in the detection signal detected by the radar sensor 20 and the strength of the detection signal detected by the radar sensor 20 is higher than the preset reference strength, the autonomous emergency braking system generates the pedestrian detection signal and recognizes the pedestrian by fusing the generated pedestrian detection signal and the pedestrian detection signal acquired by the camera 10.

More specifically, the electronic control unit 30 can generate the pedestrian detection signal even when the pedestrian is located adjacent to the counterpart vehicle and can perform fusion on the pedestrian as described above. Therefore, it is possible to recognize the counterpart vehicle and the pedestrian as the control target candidates CR, and select and control an object (pedestrian in FIG. 6) closest to the host vehicle as a control target between the recognized counterpart vehicle and the recognized host vehicle, thereby preventing an accident that may be caused by non-recognition of the pedestrian located adjacent to the counterpart vehicle.

According to the embodiments of the present invention, when the counterpart vehicle is located adjacent to the pedestrian, the pedestrian detection signal that is not included in the detection signal of the radar sensor can be generated and the fusion can be performed on the pedestrian, thereby recognizing the pedestrian.

While the embodiments of the present invention have been described with reference to the specific embodiments, it will be apparent to those skilled in the art that various changes and modifications may be made without departing from the spirit and scope of the invention as defined in the following claims.

| DESCRIPTION OF REFERENCE NUMERALS |
| --- |
| 10: camera |
| 20: radar sensor |
| 30: electronic control unit |
| 31: image processing unit |
| 32: vehicle detection unit |
| 33: pedestrian detection unit |
| 34: fusion unit |
| 35: signal processing unit |

| -continued |
| --- |
| DESCRIPTION OF REFERENCE NUMERALS |
| 36: multiple object tracking unit |
| 37: target selection unit |
| 38: determination unit |
| 39: braking control unit |
| 40: braking unit |

What is claimed is:

1. An autonomous emergency braking system for performing emergency braking when a potential collision object is recognized during traveling of a vehicle, the autonomous emergency braking system comprising:
   a camera installed in the vehicle to acquire an image signal of a proximity of the vehicle;
   a radar sensor configured to detect an object located in a preset detection region from the vehicle; and
   an electronic control unit configured to, when a counterpart vehicle is located adjacent to a pedestrian, generate a pedestrian detection signal that is not included in a detection signal acquired by the radar sensor, and recognize the pedestrian by fusing the generated pedestrian detection signal and a pedestrian detection signal detected by the camera.

2. The autonomous emergency braking system according to claim 1, wherein the electronic control unit calculates a distance between the counterpart vehicle and the pedestrian based on the image signal and, when the calculated distance is within a preset reference distance and a strength of the detection signal detected by the radar sensor is higher than a preset reference strength, generates the pedestrian detection signal, and recognizes the pedestrian by fusing the generated pedestrian detection signal and the pedestrian detection signal detected by camera.

3. The autonomous emergency braking system according to claim 2, wherein when the strength of the detection signal is not higher than the preset reference strength, the electronic control unit compares a speed of the counterpart vehicle, which is located in the proximity of the vehicle, with a preset reference speed based on the detection signal, and
   when the speed of the counterpart vehicle is higher than the preset reference speed, the electronic control unit generates the pedestrian detection signal.

4. The autonomous emergency braking system according to claim 3, wherein when the calculated distance is out of the preset reference distance or when the speed of the counterpart vehicle is not higher than the preset reference speed, the electronic control unit determines that the pedestrian is unrecognized.

5. A method for recognizing a pedestrian in an autonomous emergency braking system for performing emergency braking when a potential collision object is recognized during traveling of a vehicle, the autonomous emergency braking system including a camera installed in the vehicle to acquire an image signal of a proximity of the vehicle and a radar sensor configured to detect an object located in a preset detection region from the vehicle, the method comprising:
   receiving the image signal acquired by the camera;
   receiving a detection signal acquired by the radar sensor; and
   when a counterpart vehicle is located adjacent to a pedestrian, generating a pedestrian detection signal that is not included in the detection signal acquired from the radar sensor, and recognizing the pedestrian by fusing the generated pedestrian detection signal and a pedestrian detection signal detected by the camera.

6. The method according to claim 5, wherein the recognizing of the pedestrian comprises:

calculating a distance between the counterpart vehicle and the pedestrian based on the image signal;

determining whether the calculated distance is within a preset reference distance;

when it is determined that the calculated distance is within the preset reference distance and a strength of the received detection signal is higher than a preset reference strength, generating the pedestrian detection signal; and recognizing the pedestrian by fusing the generated pedestrian detection signal and the detected pedestrian detection signal.

7. The method according to claim 6, wherein the generating of the pedestrian detection signal comprises:

when it is determined that the strength of the detection signal is not higher than the preset reference strength, comparing a speed of the counterpart vehicle, which is located in the proximity of the vehicle, with a preset reference speed based on the detection signal; and when the speed of the counterpart vehicle is higher than the preset reference speed, generating the pedestrian detection signal.

8. The method according to claim 6, further comprising, before the generating of the pedestrian detection signal, determining that the pedestrian is unrecognized, when the calculated distance is out of the preset reference distance or when the speed of the counterpart vehicle is not higher than the preset reference speed.

* * * * *